Patented July 28, 1953

2,647,258

UNITED STATES PATENT OFFICE 2,647,258

AUTOMATIC TRACKING SYSTEM

Rawley D. McCoy, Bronxville, N. Y., assignor to The Sperry Corporation, a corporation of Delaware Application March 29, 1946, Serial No. 658,026

30 Claims. (Cl. 343—117)

My invention relates to a servomotor control system and particularly to an automatic control system for servomotors, such as those employing a control signal derived from radar equipment.

In automatic tracking apparatus, for use in which my invention finds particular application, it becomes necessary so to control the servomotors that both distant and close targets in terms of horizontal range which are flying a straight line course may be tracked with smoothness and stability. For example, such targets, whether airplanes, flying bombs, or the like, require relatively low angular velocities and accelerations of the servomotors when at a distance or at long horizontal ranges. When their horizontal range is short, however, or the targets fly directly overhead, relatively high velocities and high accelerations of the servomotors are required. Since the error signal controlling the servos is derived from radar or radio equipment, considerable filtering is necessary to prevent the servos from responding to spurious signals of frequencies higher than that of the true error signal. Response to such spurious signals produces a rough or uneven as compared to smooth tracking performance. Obviously, the smoothing value of such filtering is highest for distant targets when the true error signal changes are at low frequencies. However, for low horizontal target ranges, the response of the servos should be higher to provide higher rates and accelerations and under such conditions it becomes desirable to increase the frequency response or the ability of the system to respond to faster changing signals and provide higher output rates and accelerations even though a sacrifice in signal filtering may occur. The present invention comprises a servomotor system in which the response is variable to render the servos capable of tracking targets under all conditions of range and up to present day maximum rates of such targets within permissible error values and with smoothness and stability.

Since the present invention is particularly adapted for use in an automatic tracking system, I will hereinafter describe my invention in this particular connection, although it will be understood that its use is not limited to the particular arrangement herein illustrated and described.

In an automatic tracker of the character herein disclosed, a tracking head or scanner comprising an antenna is mounted for movement both in azimuth and elevation and separate servomotors are connected to drive the tracker in each of those modes of movement. The antenna comprised in the tracker is, in the embodiment shown, of the directional type and functions to transmit a radio wave which, upon reflection from a target, is received thereby and transmitted to a suitable receiver. The receiver, generally speaking, controls the azimuth and elevation servos in such a manner as to cause the tracker to follow a chosen target, that is, to maintain the directivity axis of the tracker substantially on or directed to the target.

As above indicated, considerable filtering of the received signal is necessary in order to obtain smooth automatic tracking performances and the degree of filtering so required is such that excessive errors result when following a target having a course requiring high accelerations of the tracker near the cross-over position. By the term "cross-over position" I mean the position of the target when the direction thereto from the tracker lies normal to its course.

In order to render the tracker capable of smooth automatic tracking performances under conditions requiring both relatively high and low accelerations thereof, I propose in the present invention to provide means for varying the response of the servo system and also preferably the gain of the circuit, which controls the rate of the servomotor in accordance with error control signals supplied thereto, and to vary the response and/or gain in accordance with the rate of the output of the servomotor.

The term "gain" as herein employed is the value of the voltage gradient with error taken from the phase detector and which is supplied to the servo amplifier. The term "response" as herein employed is intended to designate the sensitivity of the system to rapidly changing error signals or the rapidity with which it responds to signals having relatively high rates of change of amplitude, whereby the lag between tracker and target under high accelerations is less for an increased or higher response of the system.

When tracking a target requiring relatively low accelerations, the response of the system or the amplifier may be relatively low so that it will not respond to spurious errors or error voltages of comparatively high frequencies. On the other hand, when the course or speed of the target requires high accelerations on the part of the tracker, the response of the servo amplifier should be relatively increased in order to render the system responsive to relatively higher signal frequencies, and to reduce lag between the tracker and the target.

It is, therefore, a primary object of the present invention to provide a servo system particularly adapted for use in an automatic tracker which includes means for varying the response of said system in accordance with the output rate of the servomotor.

It is also another primary object of this invention to provide a servo control system or servo amplifier, the gain of which is varied in accordance with the output rate of the servo.

It is a further object to provide a response-controlled system of the foregoing character in which the response thereof is increased with an increase in the rate of the servo output; and a system in which the gain of the amplifier is increased with an increase in the output rate of the servo.

In automatic tracking systems, practice has shown that the performances thereof are satisfactory when the servo system has a certain response and gain for target speeds requiring up to some predetermined rate output of the servos but that the response and gain should be increased for servo output rates at and in excess thereof.

It is, therefore, a further object of the present invention to provide means in a servo system whereby the response thereof is substantially constant for servomotor rates below a predetermined value and which response is increased for servomotor rates at and above said predetermined value.

It is also an object to provide means in a servo system whereby the gain of the servo amplifier is substantially constant for servo rates below a predetermined value and which gain is increased for servo rates at and above said predetermined value.

From another viewpoint, objects of my invention reside in providing a servo system the response of which is varied in accordance with servomotor output rates, the response being increased with increased servo rates by varying the gain of the amplifier, by varying the magnitude of signal voltage supplied thereto per unit of error, by varying the time constant of the signal voltage integrating network embodied in said system, and by additionally varying the time constant of the stabilizing means or network which feeds back a stabilizing or damping voltage to the amplifier in the present system whereby to enable the tracker to track high or low speed targets at long or short horizontal ranges without losing them and with smoothness and stability under all of these operating conditions.

In the automatic tracker herein shown, the response of the system may be adjusted at will to one of but a few values, for example, to provide selective operating performances under all conditions up to the highest airplane speeds now obtainable. In the present invention the response of the system is automatically controlled in the same manner as the gain. Additionally, however, and for illustrative purposes and since it is suitable for the tracker herein disclosed, I have shown what constitutes primarily a manual response control which may be adjusted by the operator for best servo performance. It is therefore a further object of the present invention to provide means whereby the response of the servo system may be manually adjusted to provide the best performance of the servo system under existing conditions.

In the disclosed embodiment of the present invention, I control the response of the amplifier or system by means of a voltage integrating network. It is, therefore, a further object of the invention to provide means whereby the time constant of the integrating network may be varied to thereby vary the response of the amplifier or system.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In practically all servo systems and particularly in servo systems employed in automatic trackers and the like, it is necessary to provide some means for stabilizing the servo, that is, to dampen its operation and prevent undue oscillations in the servo loop. Ordinarily, this is accomplished by deriving a voltage which is proportional to the output rate of the servomotor and applying this damping voltage in a degenerative sense to the signal amplifier. To reduce what is termed "speed lag," that is, the degenerative effect of the damping signal under constant speed conditions, it is customary to employ a network including a condenser for passing the damping signal only under transient speed conditions of the servo output, that is, under acceleration or deceleration, the damping signal being blocked under constant output rates of the servo. I have found that, in servo systems of the character to which the present invention relates, it becomes highly desirable to vary the time constant of the damping voltage network when varying the time constant of the signal voltage integrating network or the response of the system in order to provide desirable and acceptable servo performances. As will hereinafter become apparent, I preferably provide a signal voltage integrating circuit and a damping voltage network having substantially the same value of time constant, and it is a further object of the present invention to provide means whereby the time constant of both of these circuits is varied substantially simultaneously and substantially to the same extent whereby to maintain the values thereof substantially equal under all conditions.

Additionally, it is a still further object to provide a servo system of the character herein contemplated which is so constructed and arranged as to be aperiodic for all conditions of adjustment as above outlined, that is, one which has no oscillations therein due solely to variations in circuit constants or changes in response and gain.

With the foregoing and other objects in view, my invention includes the novel elements and the combinations and arrangements thereof described below and illustrated in the accompanying drawings, in which—

In the following I will first describe the preferred embodiment of my invention in an automatic or radio tracker, indicating generally the various components thereof and thereafter, in connection with Fig. 2, I will disclose the preferred means of the present invention which I employ to control the performance of the tracker.

Figure 1:
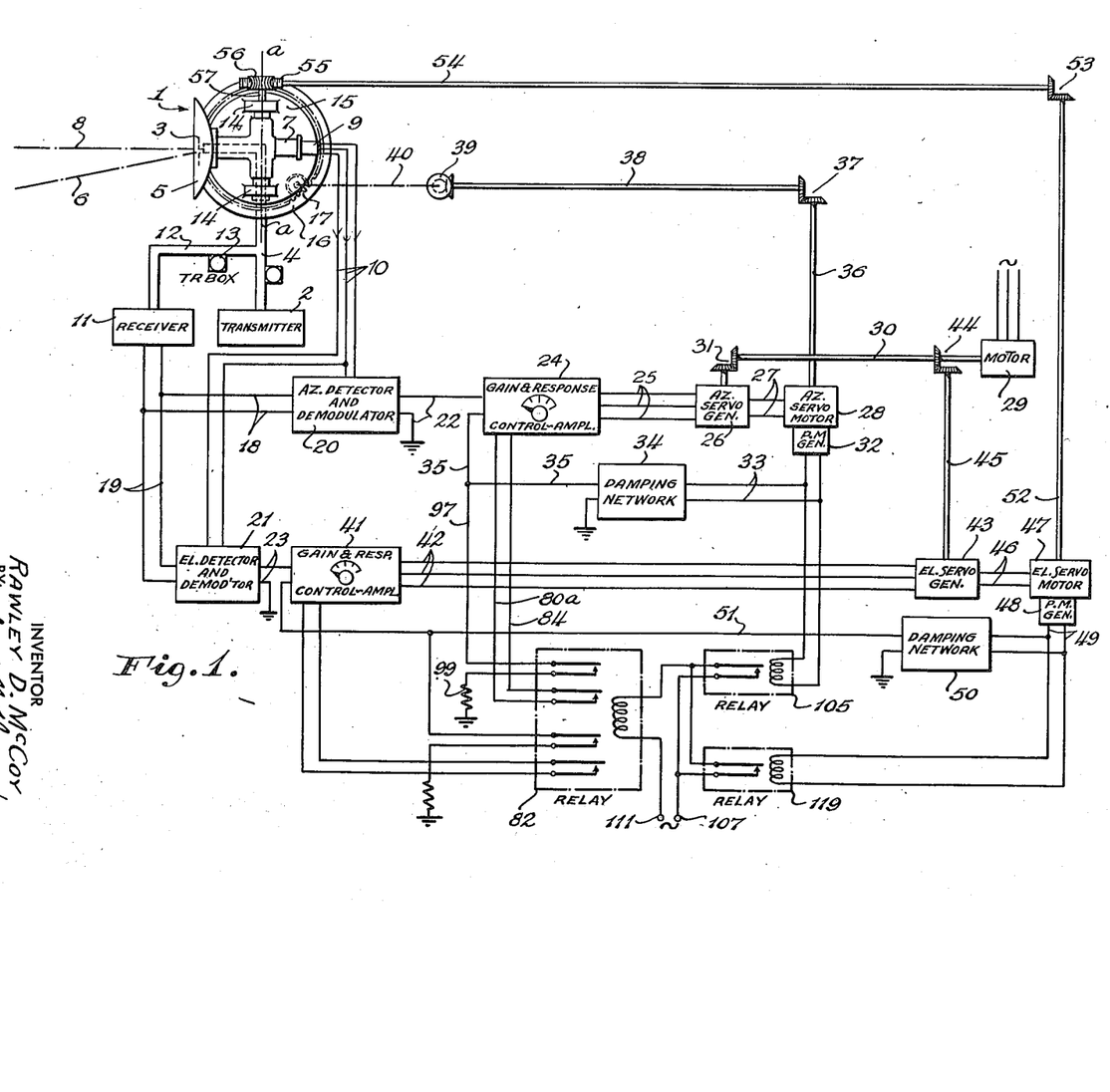
Fig. 1 is a diagrammatical representation of an automatic tracker embodying the combinations of the present invention.

Referring first to Fig. 1, 1 indicates generally a radio tracker or radio sighting system which is preferably of the ultra high frequency pulse type, such as that described in pending U. S. application Serial No. 441,188 for "Radio Gun Control System," filed on or about April 30, 1942, in the names of C. G. Holschuh et al. Application Serial No. 441,188 issued on November 11, 1952, as U. S. Patent No. 2,617,982 and is assigned to the assignee of the present invention. As more completely described in that application, a radio transmitter 2 includes means for generating short periodic pulses of ultra high frequency radio energy. These pulses of radio energy are transmitted to an antenna 3 through a suitable transmission channel such as wave guide 4. The antenna, illustrated as a dipole, is mounted within a parabolic reflector 5 and is adapted to transmit into space in a generally fan shape beam along its directivity axis 6, the pulses supplied to the antenna. The tracker head or radio scanner includes a spin motor 7 adapted to rotate antenna 3 about a spin axis 8 and the scanner as a whole rotates in azimuth and in elevation, while the antenna may spin about said spin axis in any position of the scanner. As shown, the axis 6 of the parabolic reflector is slightly offset from spin axis 8, so that as a result of its rotation about said spin axis a conical portion of space is irradiated with short pulses of electromagnetic energy. The rate of rotation of antenna 3 about the spin axis 8 may be, for example, of the order of 200 times less than the pulse repetition rate, so that all portions of the conical angle or zone of space are irradiated.

Also included with the radio scanner and rotated by said spin motor 7 is a two-phase generator 9 which generates two 90° time phase displaced voltages and transmits these voltages on leads 10 to the azimuth and elevation detector circuits, hereinafter described, to provide a time reference of the rotation of antenna 3 about said spin axis.

Should a target lie within the conical portion of space irridiated by the transmitted waves, a portion of the electromagnetic energy striking the target will be reflected back to the antenna and received in the form of pulses corresponding to the transmitted pulses, but, of course, delayed in time by an amount proportional to the distance of the target. These reflected pulses are transmitted to the radio receiver 11 as by means of wave guide 4 and wave guide 12. Should the target lie along the spin axis 8, which is the line of sight defined by the scanner, it will be apparent that all of the reflected pulses will be of substantially the same intensity. On the other hand, if the target should not lie along spin axis 8, the intensity of the reflected pulses will vary substantially sinusoidally as the antenna rotates about its spin axis, the maximum intensity occurring at the time that the axis 6 most nearly coincides with the target orientation.

A TR box 13 may be associated with the wave guide 12 so as to prevent the high intensity pulses delivered from the transmitter from passing directly to the receiver 11. The TR box functions to block such high intensity signals, but passes the lower intensity waves or pulses which are reflected back from the target and therefore substantially only the reflected pulses are supplied to the receiver 11.

The scanner is herein schematically illustrated as supported in bearings 14 for movement about the axis $a-a$ in elevation, while the bearings 14 are in turn mounted on a platform 15 which is supported for rotation in azimuth about an axis extending normal to the platform. A fixed internal azimuth gear 16 meshes with a pinion 17 which in turn is journaled on the platform 15, and, as hereinafter described, the azimuth servomotor drives pinion 17 to cause the platform and scanner to rotate in one direction or the other in azimuth. Similarly, as hereinafter described, the elevation servo is connected to rotate the scanner in elevation. It will be understood that the wave guide 4 extends from the transmitter to the antenna, suitable provision being made for proper connections to permit of the above pointed out movements of the scanner. In practice, the servomotors may be mounted on the platform 15 and Fig. 1 of the drawing is intended to show this arrangement. Likewise, the transmitter, receiver and other components of the system may be mounted to rotate with platform 15.

The radio receiver 11 includes detecting means for providing a sinusoidal signal voltage corresponding to the substantially sinusoidal variation in intensity of the reflected pulses. This signal voltage is supplied by means of leads 18 and 19 to the azimuth and elevation detectors or phase sensitive demodulators. One reference voltage from the two-phase generator 9 is supplied to the azimuath detector 20 and the second voltage, which is 90° displaced from the first voltage in time phase, is supplied to the elevation detector 21. By comparing both the phase and magnitude of the sinusoidal signal voltage derived from receiver 11 with the two 90° phase-displaced reference voltages from the two-phase generator, the azimuth and elevation components of the error voltage derived from receiver 11 may be ascertained. A preferred arrangement of the azimuth or elevation detector or phase sensitive demodulator, is illustrated in Fig. 2 and will later be described, but for the present it will be understood that the output of the azimuth detector is a unidirectional voltage corresponding in magnitude and polarity to the azimuth component of the angular deviation between the target orientation and spin axis 8. The elevation detector in like manner compares the phase and magnitude of the error signal derived from receiver 11 with the second time reference voltage and produces a unidirectional voltage output corresponding in magnitude and polarity to the elevation component of the angular deviation between the target orientation and spin axis 8. As shown in Fig. 1, the unidirectional azimuth error voltage appears across leads 22, one of which may be grounded, and the unidirectional elevation error voltage appears across leads 23, one of which likewise may be grounded.

In practice, in the case of the azimuth servo, a secant-correcting means, such as a potentiometer, is embodied in the system, as shown and described in pending application Serial No. 517,008 which was filed in the U. S. Patent Office on January 5, 1944, in the names of G. E. White and D. S. Pensyl. Briefly, the azimuth signal voltage applied across the potentiometer is a measure of the azimuth error measured in the slant plane in which the tracker follows the target. To obtain a true azimuth error signal, the potentiometer is wound so that the voltages obtained therefrom by means of a wiper or slidable contact varies approximately as the secant of the angle moved through by the wiper. This wiper is rotated in accordance with the elevation angle of the tracker or line of sight thereof and hence, the voltage derived from said potentiometer, which is supplied to the servo control amplifier, is the error voltage applied to the potentiometer times the secant of the elevation angle or a signal voltage proportional to the azimuth error measured in the azimuth plane which is a voltage proportional to true azimuth error and necessary for proper control of the azimuth servo.

The unidirectional azimuth error voltage is employed to control the azimuth servo and the elevation error voltage is employed to control the elevation servo. However, in accordance with my invention, a control amplifier having a variable gain and response characteristic is connected to receive the azimuth error signal from the azimuth detector and to control the azimuth motor. In like manner, an amplifier having a similar characteristic is embodied in the elevation servo loop. In Fig. 1, the variable gain and response control amplifier for the azimuth servo is indicated generally at 24 and is connected to receive the azimuth signal voltage from azimuth detector 20. Amplifier 24 is shown in a preferred form in Fig. 2 and will later be described in detail. Its output, however, is in the embodiment herein illustrated connected in controlling relation by means of leads 25 to the field windings of a generator 26, the output of amplifier 24 serving to control the magnitude and polarity of the output of generator 26 appearing on leads 27, which are connected with the azimuth servomotor 28.

The azimuth and elevation servos in the embodiment illustrated are of the Ward-Leonard type, the azimuth servo mechanism including the generator 26, which is driven by a preferably constant speed three-phase motor 29 through shaft 30 and gearing 31, and the azimuth servomotor 28, which is energized by the output of generator 26. Other types of servomotors or servo mechanisms may, of course, be employed.

For damping purposes, the output of servomotor 28 is connected to drive a PM or permanent magnet generator 32 which functions to supply a unidirectional control voltage having a magnitude proportional to the rate of the servo output and of a polarity depending upon the direction of rotation of the azimuth servo. The output of PM generator 32 is supplied through leads 33 to a damping network 34, hereinafter to be described, and the output of network 34 is supplied through lead 35 in controlling relation to the amplifier 24. One output terminal of network 34 may be grounded as shown.

A detailed description of a preferred embodiment of the gain and response control amplifier 24 and the damping network 34 is hereinafter presented in connection with Fig. 2. The azimuth servo drives pinion 17, hereinbefore described, through suitable shafting and gears from the output shaft 36 of the servomotor. This transmission may comprise bevel gears 37, shaft 38 and bevel gears 39 which are connected with pinion 17 through a motion transmitting connection represented schematically by the dash-dot line 40.

The elevation servo loop is generally similar to the above described azimuth servo loop. That is to say, the output of the elevation detector and demodulator 21 is supplied to the elevation gain and response control amplifier 41 which may be of the same construction as the corresponding azimuth amplifier 24. The output of amplifier 41 is supplied by leads 42 to control the field windings of the elevation servo generator 43. This generator, like azimuth generator 26, may be driven from constant speed motor 29 through the medium of bevel gears 44 and shaft 45, the output of elevation generator 43 being supplied by leads 46 to the elevation servomotor 47. As in the case of the azimuth servo system, elevation servomotor 47 is connected to drive a PM generator 48, the output of which is supplied by leads 49 to a damping network 50 which may be of the same character as network 34. The output of network 50 is supplied by lead 51 to control the amplifier 41. The output shaft 52 of the elevation servomotor is shown schematically as connected to drive the scanner in elevation through the medium of bevel gears 53 and shaft 54 which drives worm 55 meshing with worm wheel 56 which is connected by shaft 57 to rotate the scanner or antenna and parabolic reflector about the axis $a$—$a$ in elevation.

Figure 2:
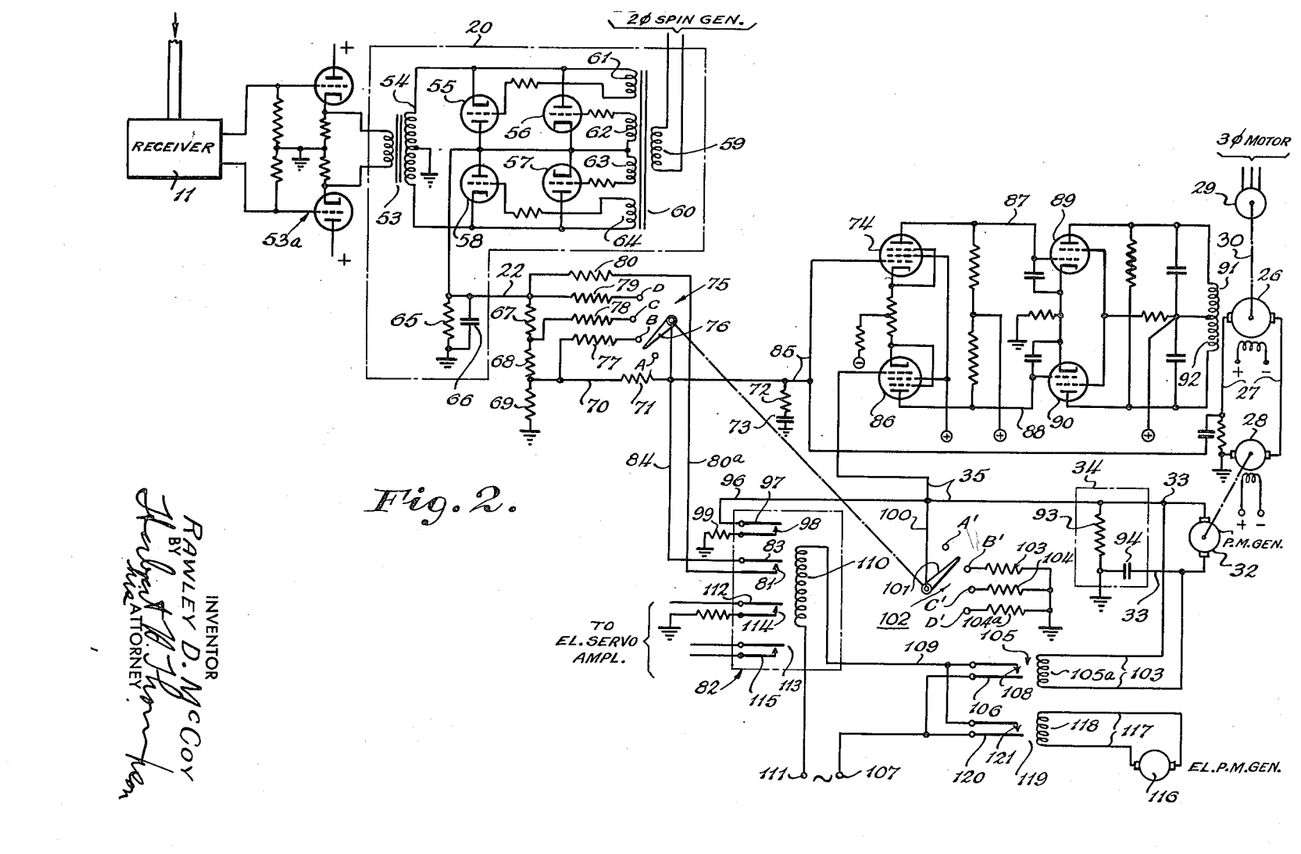
Fig. 2 is a wiring diagram of the signal voltage amplifier and associated mechanisms for controlling the gain, response and stability of the servo system.

Since the gain and response control amplifier and damping networks in each of the elevation and azimuth servo loops may be identical, a description of one thereof and the manner in which the gain and response of one loop is rendered dependent upon the output speed of the servomotor in that loop and also upon the servomotor in the other loop, should be clearly apparent from a description of the gain and response control amplifier and stabilizing control means embodied in one of said loops and which is illustrated in detail in Fig. 2.

Referring now to Fig. 2, which we may assume is a disclosure of the circuit components employed in the control of the azimuth servomotor, it will be seen that the azimuth detector or phase sensitive demodulator is shown within the dash-line outline 20 and corresponds to the similarly designated rectangle in Fig. 1. The circuit which is connected to the output of demodulator 20 and which connects with the field windings 91 and 92 of generator 26 constitutes the gain and response control amplifier designated by reference numeral 24 in Fig. 1.

In Fig. 2, the output of receiver 11 is supplied through a cathode follower stage represented generally at 53a to the primary of an input transformer 53. The secondary 54 of transformer 53 is connected to the plates or cathodes, as the case may be, of rectifier tubes 55, 56, 57 and 58. The grids of these tubes are energized from one of the phases of the two-phase spin frequency generator 9. In the embodiment illustrated, the primary 59 of transformer 60 is connected to the spin frequency generator and the secondary of said transformer comprises four windings 61, 62, 63 and 64 which are respectively connected to the grids of tubes 55—58. This circuit, which forms no part of the present invention, functions as a full wave, phase-sensitive demodulator or rectifier to supply a unidirectional signal voltage across resistor 65 in the output thereof, which has a magnitude proportional to the amplitude of the input signal and a polarity depending upon the phase sense of the input signal relative to the spin frequency generator voltage which is supplied to the demodulator. A filtering condenser 66 may be connected across output resistor 65.

The output of demodulator 20, which is a unidirectional voltage proportional to the azimuth component of the error angle or the angle between the directivity axis of the scanner and the direction to the target, is supplied in the embodiment illustrated across series connected resistors 67, 68 and 69. A suitable proportion of the input signal is derived (at lower tracking speeds) from across resistor 69 by means of lead 70 and supplied through an integrating network, comprising series connected resistors 71, 72 and condenser 73, to the control grid of one tube 74 of a D. C. amplifier.

The fractional part of the control signal which is derived from resistance 69, is sufficient to provide adequate gain for all relatively slow output speeds of the servomotor or for relatively low accelerations. This signal is supplied to the integrating network, which functions to render the amplifier substantially unresponsive to spurious error voltages or to high frequencies.

In the illustrative embodiment of my invention shown in Fig. 2, a manually operable switch indicated generally at 75 is provided for the purpose of manually changing the gain of the amplifier and mainly for changing the time constant of the integrating network and thereby the response of the amplifier. The switch 75 comprises the arm 76 and a plurality of contacts, herein illustrated as four in number and designated as A, B, C and D. Contact A is not connected in circuit. Contact B is connected through resistance 77 to lead 70. Hence, when arm 76 engages contact B resistance 77 will be connected in parallel with resistance 71 of the integrating circuit thereby decreasing the time constant of the integrating network. Contact C is connected through resistor 78 to a point between resistances 67 and 68. Similarly, therefore, when arm 76 engages contact C, it will function to shunt resistance 71 with another value of resistance, while at the same time a greater fraction of the signal voltage will be utilized. Contact D is connected through resistance 79 directly with lead 22 which connects with the output of demodulator 20. A shunting of resistance 71 with still a different value of resistance while utilizing an increased or full value of the input signal will result when arm 76 engages contact D. The values of the resistances are, of course, so chosen as to provide the desired changes in degree of response.

Additionally, still another resistance 80 is connected by means of lead 80a in series between input lead 22 and a contact 81 of a gain and response control relay represented as enclosed within the dash line rectangle 82. The armature 83 thereof which cooperates with contact 81 is connected through lead 84 to the arm 76 of switch 75 and also to lead 85, which connects the integrating network with the D.C. amplifier. It will be seen that when armature 83 engages contact 81 of the relay 82 the gain of the amplifier and also its response will be materially increased because the full value of the input signal voltage is utilized and supplied through resistor 80 in shunt relation to the integrating network. The actuation or closing of the contacts of relay 82 is dependent upon the output rate or speed of the associated servomotor, as will hereinafter appear. Also, the actuation of this relay will also be dependent, in the preferred tracker system, upon the output speed of the elevation servomotor to control both the azimuth and elevation servosystems, as will be hereinafter explained.

From the foregoing, it will be clear that the switch 75 is operable primarily to control the response of the servoamplifier, but also the gain, and additionally the relay 82 is operable primarily to control the gain, but also the response, of the amplifier.

The input stage of the D. C. amplifier herein illustrated includes the tube 74, above referred to, and tube 86. These tubes are illustrated as pentodes, although other types of tubes may be employed, serving as amplifiers and supplying the outputs thereof through leads 87 and 88 to the control grids of tubes 89 and 90, respectively. The plates of tubes 89 and 90 are connected in push-pull relationship across the field windings 91 and 92 of generator 26. Hence, the voltage outputs of tubes 89 and 90 oppose each other to provide equal and opposite generator exciting fields under quiescent conditions when no signal is supplied to the D. C. amplifier on lead 85 or on lead 35. Under this condition, the generator 26 which is driven by motor 29 supplies no output voltage across leads 27 and therefore the servomotor does not operate. The D. C. amplifier operates as a balanced amplifier and effects an operation of the servomotor 28 in one direction or the other depending upon the polarities of the signal voltages supplied thereto on leads 85 and 35 and drives the motor at a rate dependent upon the algebraic sum of said signal voltages.

For damping purposes, the PM generator 32, hereinbefore described, is driven from servomotor 28 and its output is supplied through leads 33 to the damping network 34. This damping network may be considered as a differentiating network and in the embodiment illustrated comprises a resistance 93 and a condenser 94 which are connected in series across the output of the PM generator. The common connection between resistance 93 and condenser 94 may be connected to ground as shown and the opposite end of resistance 93 is connected through lead 35 to the control grid of tube 86 hereinbefore described as embodied in the input stage of the D. C. amplifier. With the arrangement of the network as shown, no damping voltage or degeneratively acting voltage will be supplied to the D. C. amplifier under constant output speeds of the servomotor 28. Under transient conditions, however, a damping voltage will be supplied through lead 35 to the D. C. amplifier to effect its predesigned purpose.

As hereinbefore pointed out, I propose in the present invention not only to control the time constant of the integrating network, but likewise to control the time constant of the damping network 34, preferably so that their time constant values will be substantially equal under all conditions. Accordingly, lead 35 in the output of the damping network is connected through lead 96 to a second armature 97 of relay 82 and its cooperating contact 98 is connected through resistance 99 to ground. Hence, when relay 82 is actuated, it not only serves to increase the gain of the amplifier as above pointed out, but also to change the time constant of the damping network 34, since resistance 99 will be connected in parallel with the resistance 93 thereof.

Further in accordance with my invention, the time constant of damping network 34 is manually controlled in the same manner as the integrating network. For this purpose, I have in the embodiment illustrated, connected lead 35 through lead 100 to the arm 101 of a second manually operable switch indicated generally at 102. This switch, like switch 76, comprises preferably four contacts indicated at A', B', C' and D'. Contact A' is unconnected in circuit like contact A of switch 75. Contacts B', C' and D' are connected respectively through resistances 103, 104 and 105 to ground. The values of resistances 103, 104 and 105 are so selected that the desired time constant values of the damping network are obtained when the arm 101 of the switch engages the associated contacts. As illustrated, by the dash-dot lines, I prefer to operate switches 75 and 102 in synchronism. Furthermore, I prefer to so correlate the values of the resistances associated with switches 75 and 102 and the resistance 99 that the time constants of the integrating network and the damping network may be simultaneously varied, but will have substantially equal values at all times.

For example, experiments have shown that unequal time constants in the integrating and damping networks result in different amounts of lag for incoming and outgoing targets flying a straight line course. If, the time constant of the PM generator or damping network is greater, the deceleration lag or error for the outgoing target will be larger than the acceleration lag or error for an incoming target. This condition is undesirable because the amount of deceleration lag will be disproportionately greater than it should be for the amount of filtering which will result. On the other hand, if the integrating network time constant is larger, the acceleration lag will be greater than the deceleration lag, again resulting in undesirable conditions.

As hereinbefore indicated, I propose to control the gain and the response in accordance with the output rate of the servomotor. In the embodiment illustrated, the output of the PM generator 32 is also connected by leads 103 to the field coil 105a of a relay 105. The armature 106 of this relay is connected to one side 107 of a suitable source of current and its cooperating contact 108 is connected through lead 109 to one end of the coil 110 of relay 82, the other end of said coil being connected to the other side 111 of said current source. Hence, when the output rate of servo 28 attains some preselected value, sufficient voltage will be generated by PM generator 32 to close the relay 105 thereby exciting the relay 82 and causing its armatures to engage their cooperating contacts. Therefore, upon the attainment of some preselected rate output of the azimuth servo, relay 82 will operate through the medium of armatures 97 and 83 and their associated contacts 98 and 84 to change the gain and response of the servo amplifier and also to change the time constant of the stabilizing or damping network. Obviously, means other than a relay may be employed to control the amplifier or servo system in the same manner, or, means may be employed for gradually effecting these changes rather than abruptly or in steps as will result with the use of a relay and/or the switches 75 and 102. In other words, the gain may be gradually increased or decreased with increases or decreases over a range of speeds of the servomotor and the response of the system may be correspondingly gradually increased or decreased.

In automatic tracking systems used, for example, in tracking airplanes and the like, it is desirable not only to control the gain, response or time constant of the integrating networks, and the time constant of the stabilizing network of the azimuth servo in accordance with azimuth rates, but also to control these factors in accordance with the output rate of the elevation servo, and also to control corresponding factors or variables in the elevation servo loop, both in accordance with elevation and azimuth servo rates. Hence, as illustrated in Figs. 1 and 2, the relay 82 controls the gain and response and the time constant of the damping network of both the azimuth and elevation servos in accordance with the speeds of both the azimuth and elevation servomotors. In Fig. 2, I have shown the relay 82 as also comprising armatures 112 and 113 and associated contacts 114 and 115 which correspond to the armatures and contacts hereinbefore described in connection with relay 82. The closing of armatures 112 and 113 with contacts 114 and 115, respectively, effect the same changes in the elevation servo amplifier as are effected by the armatures and contacts above described in connection with the azimuth amplifier. Therefore, the azimuth PM generator controls not only the gain and response of the azimuth servo, but also the gain and response of the elevation servo. PM generator 116, which it will be understood is driven by the elevation servomotor, has its output connected by leads 117 across the coil 118 of relay 119. The armature 120 of relay 119 is connected with one side 107 of the current source and its associated contact is connected to lead 109, whereby either relay 105 or 119, or both, may operate to energize the field of relay 82. With this arrangement, the gain, response and damping network time constant of the azimuth and elevation servos are controlled in accordance with the output speeds of both the azimuth and elevation servomotors. This arrangement is diagrammatically shown in Fig. 1.

The control of the amplifiers in accordance with the speeds of both servomotors is desirable in automatic tracking apparatus of the character herein described, because for a plane flying a straight course, for example, it is practically impossible to get excessive angular accelerations without first exceeding either an azimuth rate of, for example, 125 mils per second or an elevation rate of, for example 80 mils per second. Actual field tests indicate that for azimuth or elevation servo rates above some predetermined values, such as those above indicated, it is necessary to increase the response and gain of both servos in order to track high speed targets with low crossover horizontal ranges. The relays 105 and 119 may be arranged according to the above example to close at different output rates of the associated servomotors, the relay 105 being arranged to close for azimuth rates, for example, at and above 125 mils per second and the relay 119 being arranged to close for elevation servo rates, for example, at and above say 80 mils per second.

Figure 3:
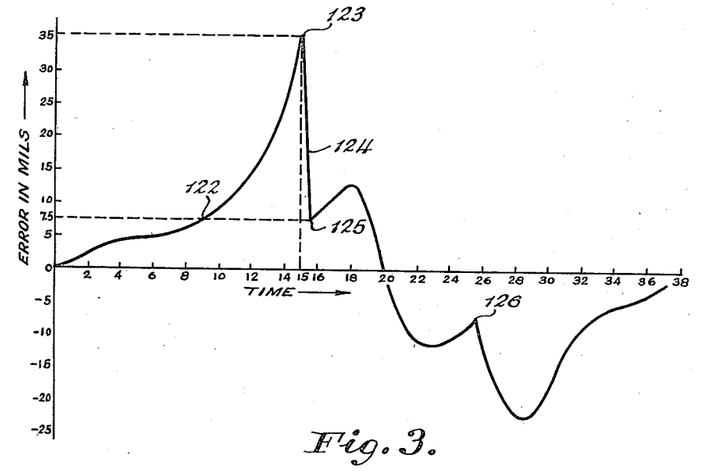
Fig. 3 shows a performance curve of the servo system of the present invention illustrating the effect of the gain, response and stability control means on the servo performance.

In Fig. 3, I have shown a typical curve representing error in mils plotted against time for a target flying a straight line course and requiring a maximum azimuth rate of 350 mils per second at the crossover position of the target for a radar tracker of the type described with the selector switches in the A and A' positions. A curve of this character may be employed as a criterion for smoothness of tracking and also for ability to track crossing courses. The portion 122 of the curve which extends between the zero time value and the point 123 representing, for example, 15 seconds, discloses the manner in which error increases in tracking a target under the above conditions. It will be observed that curve 122 curves asymptotically toward infinity and therefore under such conditions the target will be lost. Point 123 represents the time at which the relay closes and it will be observed that the curve immediately approaches the time axis (note portion 124 of the curve) which indicates that the error is being reduced. The balance of the curve illustrates that the tracker with the relay closed will track a target with errors well within the permissible maximum. Point 126 on the curve represents the point at which the relay opens. The amplitude of the error may be diminished by moving the time constant control switches to the B, C or D positions. The curve of Fig. 3 serves to show that the closing of the relay quickly reduces the error from 35 mils at point 123 to about 7½ mils at point 125 and thereafter keeps the tracker on the target within allowable error values.

Figure 4:
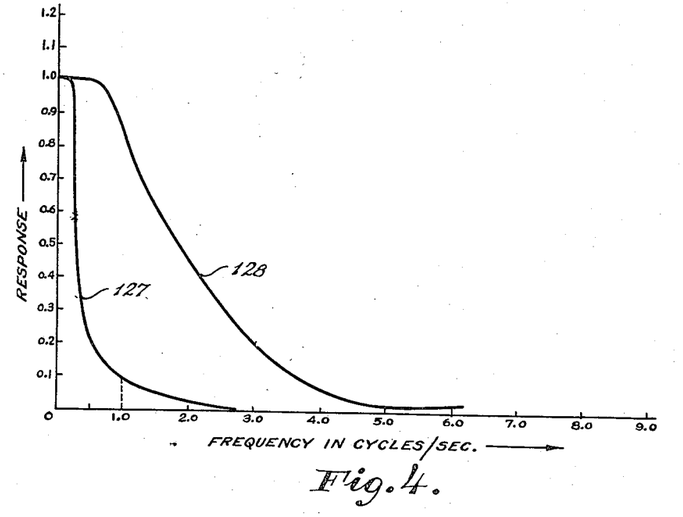
Fig. 4 is a curve showing the response of the system over a range of signal frequencies.

Referring to Fig. 4, I have shown curves representing the response of the servo system over a range of frequencies. Curve 127 shows the response when the relay 82 is open and the switches are on contacts A and A'. It will be seen that the response drops off sooner and more rapidly for curve 127 than for curve 128, which latter curve is representative of the system response when the relay is closed and the switches are on contacts A and A'. These curves are plotted from data using constant amplitude, sinusoidal error signals, curve 127 showing that the cut-off frequency at the one-half amplitude point is about 0.5 cycle per second when the relay is open and curve 128 showing that the cut-off value is increased to about 1.8 cycles per second when the relay is closed. These curves also serve to illustrate that the servo system is quite stable and will provide smooth tracking under open or closed conditions of the relay, being capable of responding to and following higher accelerations with the relay closed.

Hence, while I have described my invention in its preferred embodiments and usage, it is to be understood that the words which I have used are words of description and not of limitation and that changes within the purview of the appended claims may be made without departing from the true scope and spirit of the present invention in its broader aspects.

What is claimed is:

1. A control system of the character described comprising a source of control signal voltage, a servo mechanism, an amplifier having its input connected to receive said signal voltage and its output connected in controlling relation to said servo mechanism, and means for controlling the response of said system in response to the rate of the servo output.

2. A control system of the character described comprising a source of control signal voltage, a servo mechanism, an amplifier having its input connected to receive said signal voltage and its output connected in controlling relation to said servo mechanism, and means for increasing the response of said system in response to an increase in the rate of the servo output.

3. A control system of the character described comprising a source of control signal voltage, a servo mechanism, an amplifier having its input connected to receive said signal voltage and its output connected in controlling relation to said servo mechanism, means for controlling the response of said system in response to the rate of the servo output, and means for controlling the gain of said system.

4. A control system of the character described comprising a source of control signal voltage, a servo mechanism, an amplifier having its input connected to receive said signal voltage and its output connected in controlling relation to said servo mechanism, and means for simultaneously varying the gain and response of said system in response to the rate of the servo output.

5. A control system of the character described comprising a source of control signal voltage, a servo mechanism, an amplifier having its input connected to receive said signal voltage and its output connected in controlling relation to said servo mechanism, means for controlling the stability of said system, and means for simultaneously controlling the response of said amplifier and said stability-controlling means in response to the output rate of said servo mechanism whereby to improve the system stability under increased sensitivity conditions.

6. A control system of the character described comprising a source of control signal voltage, a servo mechanism, an amplifier having its input connected to receive said signal voltage and its output connected in controlling relation to said servo mechanism, gain control means for said system, response control means for said amplifier, stability-controlling means for said system, and means operable in response to the output rate of said servo mechanism for actuating all of said control means.

7. A control system of the character described comprising a source of control signal voltage, a servo mechanism, an amplifier having its input connected to receive said signal voltage and its output connected in controlling relation to said servo mechanism, means for integrating said signal voltage, and means operable in response to the output rate of said servo mechanism for controlling the gain of said system.

8. A control system of the character described comprising a source of control signal voltage, a servo mechanism, an amplifier having its input connected to receive said signal voltage and its output connected in controlling relation to said servo mechanism, means for supplying a voltage proportional to the output rate of said servo mechanism, and means controlled by said latter voltage for controlling the response of said amplifier.

9. A control system of the character described comprising a source of control signal voltage, a servo mechanism, an amplifier having its input connected to receive said signal voltage and its output connected in controlling relation to said servo mechanism, variable time constant means for integrating said signal voltage, means for varying the gain of said system, means for supplying a voltage proportional to the output rate of said servo mechanism, and means controlled by said latter voltage for actuating said variable time constant means and gain-varying means.

10. The combination recited in claim 9, in which the last-mentioned means simultaneously effects a change in the gain of said system and a change in the time constant of said integrating means.

11. A control system of the character described comprising a source of control signal voltage, a servo mechanism, an amplifier having its input connected to receive said signal voltage and its output connected in controlling relation to said servo mechanism, means for supplying a speed voltage proportional to the output rate of said servo mechanism, means including a variable time constant network for supplying a component of said speed voltage as a damping voltage to said amplifier, means for varying the gain of said system, and means controlled by said speed voltage for changing the time constant of said network and for actuating said gain-varying means.

12. The combination recited in claim 11, in which the last-mentioned means effects a simultaneous variation in the gain of said system and the time constant of said network.

13. A control system of the character described comprising a source of control signal voltage, a servo mechanism, an amplifier having its input connected to receive said signal voltage and its output connected in controlling relation to said servo mechanism, means for controlling the response of said system, damping means for controlling the stability of said system, and means responsive to the output rate of said servo mechanism for simultaneously adjusting said response and stability-controlling means.

14. A control system of the character described comprising a source of control signal voltage, a servo mechanism, an amplifier having its input connected to receive said signal voltage and its output connected in controlling relation to said servo mechanism, variable time constant means for integrating said signal, means for supplying a damping voltage proportional to the output rate of said servo mechanism, means including a variable time constant network for supplying said damping voltage to said amplifier, and means responsive to the output rate of said servo mechanism for simultaneously varying the time constant of said integrating means and said damping voltage network.

15. A radio tracking system comprising a scanner having a directional axis and mounted for movement in azimuth and elevation, said scanner comprising an antenna having a directivity axis, means including a receiver connected with said antenna for supplying signal voltages proportional to the azimuth and elevation components of the angular error or lack of coincidence between the directional axis of said scanner and the direction therefrom to a distant target, an azimuth servo mechanism comprising an azimuth amplifier connected to receive the azimuth component error voltage and an azimuth servomotor controlled by the output of said azimuth amplifier and connected to drive said scanner in azimuth; an elevation servo mechanism comprising an elevation amplifier connected to receive the elevation component error voltage and an elevation servomotor controlled by the output of said elevation amplifier and connected to drive said scanner in elevation, and means for controlling the response of both servo mechanisms in accordance with the output rate of one of said servomotors.

16. A radio tracking system comprising a scanner having a directional axis and mounted for movement in azimuth and elevation, said scanner comprising an antenna having a directivity axis, means including a receiver connected with said antenna for supplying signal voltages proportional to the azimuth and elevation components of the angular error or lack of coincidence between the directional axis of said scanner and the direction therefrom to a distant target, an azimuth servo mechanism comprising an azimuth amplifier connected to receive the azimuth component error voltage and an azimuth servomotor controlled by the output of said azimuth amplifier and connected to drive said scanner in azimuth, an elevation servo mechanism comprising an elevation amplifier connected to receive the elevation component error voltage and an elevation servomotor controlled by the output of said elevation amplifier and connected to drive said scanner in elevation, and means for increasing the response of one of said servo mechanisms in response to an increased output rate of the servomotor comprised therein.

17. A radio tracking system comprising a scanner having a directional axis and mounted for movement in azimuth and elevation, said scanner comprising an antenna having a directivity axis, means including a receiver connected with said antenna for supplying signal voltages proportional to the azimuth and elevation components of the angular error or lack of coincidence between the directional axis of said scanner and the direction therefrom to a distant target, an azimuth servo mechanism comprising an azimuth amplifier connected to receive the azimuth component error voltage and an azimuth servomotor controlled by the output of said azimuth amplifier and connected to drive said scanner in azimuth, an elevation servo mechanism comprising an elevation amplifier connected to receive the elevation component error voltage and an elevation servomotor controlled by the output of said elevation amplifier and connected to drive said scanner in elevation, and means for controlling the response of both servo mechanisms in accordance with the rate of the outputs of each of said servomotors.

18. In a follow-up system for driving a member about two axes of support therefor to follow a reference object angularly movable relative to both of said two axes, means for deriving signal voltages proportional to the error or lack of agreement in angular position of said member and object about each of said axes, a pair of means for respectively driving said member about said axes, a pair of control means connected respectively to receive said error voltages and for respectively controlling the driving means to reduce said error voltages, and means for controlling the response of both of said control means in response to the output rates of both driving means.

19. In a follow-up system for driving a member about two axes of support therefor to follow a reference object angularly movable relative to both of said two axes, means for deriving signal voltages proportional to the error or lack of agreement in angular position of said member and object about each of said axes, a pair of servomotor systems each including means for respectively driving said member about said axes and amplifier means connected to receive said error voltages, respectively, and for respectively controlling the driving means to reduce said error voltages, means for increasing the gain of both of said systems when the output rate of either of said driving means increases above a predetermined value, variable response control means and variable damping means for each system, and means for simultaneously varying the response control and damping means associated with one of said amplifiers.

20. A control system of the character described comprising a source of control signal voltage, a servo mechanism, an amplifier having its input connected to receive said signal voltage and its output connected in controlling relation to said servo mechanism, means for changing the response of said system, a relay for controlling said response-changing means, and means driven by said servo mechanism for supplying a voltage proportional to the output rate thereof to said relay.

21. A control system of the character described comprising a source of control signal voltage, a servo mechanism, an amplifier having its input connected to receive said signal voltage and its output connected in controlling relation to said servo mechanism, variable time constant means for integrating said signal voltage, means including a variable time constant network for supplying a damping voltage to said amplifier, a relay for effecting changes in the time constant value of said integrating means and network, and a generator driven by said servo mechanism for supplying an operating voltage to said relay.

22. A control system of the character described comprising a source of control signal voltage, a servo mechanism, an amplifier having its input connected to receive said signal voltage and its output connected in controlling relation to said servo mechanism, means for changing the gain of said system, switch means for controlling said gain-changing means, and means operable in response to the output rate of said servo mechanism for effecting an operation of said switch means.

23. A control system of the character described comprising a source of control signal voltage, a servo mechanism, an amplifier having its input connected to receive said signal voltage and its output connected in controlling relation to said servo mechanism, a variable time constant network for controlling the gain and response of said system, and means for decreasing the time constant of said network in response to an increase in the output rate of said servo mechanism.

24. A control system of the character described comprising a source of control signal voltage, a servo mechanism, an amplifier having its input connected to receive said signal voltage and its output connected in controlling relation to said servo mechanism, a variable time constant network for controlling the gain and response of said system, means including a voltage generator and a variable time constant network in circuit therewith for supplying a damping voltage in degenerative fashion to said amplifier, and means for decreasing the time constant of both networks in response to an increase in the output rate of said servo mechanism.

25. A control system of the character described comprising a source of control signal voltage, a servo mechanism, an amplifier having its input connected to receive said signal voltage and its output connected in controlling relation to said servo mechanism, means for controlling the proportion of the available signal voltage to the signal voltage input to said amplifier, and means for increasing the input signal value in response to increased servo mechanism output rates.

26. A control system of the character described comprising a source of control signal voltage, a servo mechanism, an amplifier having its input connected to receive said signal voltage and its output connected in controlling relation to said servo mechanism, means for controlling the proportion of the available signal voltage to the signal voltage input to said amplifier, a variable time constant for integrating the input signal voltage, and means for increasing the input signal value and for decreasing the time constant of said integrating network in response to increased servo mechanism output rates.

27. A control system of the character described comprising a source of control signal voltage, a servo mechanism, an amplifier having its input connected to receive said signal voltage and its output connected in controlling relation to said servo mechanism, means for varying the response of said system, means for producing a speed voltage proportional to the output rate of said servo mechanism, a variable time constant feedback circuit for supplying said speed voltage in degenerative fashion to said amplifier, and means for simultaneously varying the response of said system and the time constant of said feedback circuit.

28. A control system of the character described comprising a source of control signal voltage, a servo mechanism, an amplifier having its input connected to receive said signal voltage and its output connected in controlling relation to said servo mechanism, a variable time constant network for connecting the signal voltage to the input of said amplifier, means for producing a speed voltage proportional to the output rate of said servo mechanism, a variable time constant feedback circuit for supplying said speed voltage in degenerative fashion to said amplifier, and means for simultaneously varying the time constant of said network and the time constant of said feedback circuit.

29. A control system of the character described comprising a source of control signal voltage, a servo mechanism, an amplifier having its input connected to receive said signal voltage and its output connected in controlling relation to said servo mechanism, an impedance-reactance network for coupling the signal voltage to the input of said amplifier including a variable impedance for varying the time constant of said network, means for producing a speed voltage proportional to the output rate of said servo mechanism, an impedance-reactance network for coupling said speed voltage in degenerative fashion to said amplifier and including a variable impedance, and means for simultaneously varying the variable impedance in both of said networks.

30. A control system of the character described comprising a source of control signal voltage, a servo mechanism, an amplifier having its input connected to receive said signal voltage and its output connected in controlling relation to said servo mechanism, means for varying the amplitude of the signal voltage supplied to said amplifier that corresponds to any given error value, means for supplying a speed voltage proportional to the output rate of said servo mechanism, an impedance-reactance network including means for varying the time constant thereof and for supplying the speed voltage in degenerative fashion to said amplifier, and manual means for simultaneously actuating said signal voltage-varying means and said time constant-varying means.

RAWLEY D. McCOY.

References Cited in the file of this patent

UNITED STATES PATENTS

| Number | Name | Date |
| --- | --- | --- |
| 2,088,654 | Hull | Aug. 3, 1937 |
| 2,192,022 | Wills | Feb. 27, 1940 |
| 2,257,757 | Moseley | Oct. 7, 1941 |
| 2,352,103 | Jones | June 20, 1944 |
| 2,408,069 | Hull et al. | Sept. 24, 1946 |
| 2,412,612 | Godet | Dec. 17, 1946 |
| 2,414,430 | Nisbet | Jan. 14, 1947 |
| 2,417,248 | Godet | Mar. 11, 1947 |
| 2,422,333 | Bedford | June 17, 1947 |
| 2,422,334 | Bedford | June 17, 1947 |
| 2,423,337 | Moseley | July 1, 1947 |
| 2,446,024 | Porter | July 27, 1948 |